United States Patent [19]

Iwatani

[11] Patent Number: 4,937,514
[45] Date of Patent: Jun. 26, 1990

[54] AC GENERATOR CONTROL APPARATUS FOR VEHICLES

[75] Inventor: Shiro Iwatani, Himeji, Japan

[73] Assignee: Mitsubishi Denki K.K., Tokyo, Japan

[21] Appl. No.: 296,725

[22] Filed: Jan. 13, 1989

[30] Foreign Application Priority Data

Jan. 20, 1988 [JP] Japan .................................. 63-11270

[51] Int. Cl.⁵ .............................................. H02J 7/14
[52] U.S. Cl. ....................................... 322/33; 322/23; 322/28; 361/20
[58] Field of Search ....................... 322/22, 25, 27, 28, 322/29, 32, 33, 34, 23, 35; 320/64; 361/20

[56] References Cited

U.S. PATENT DOCUMENTS

| | | | |
|---|---|---|---|
| 3,643,153 | 2/1972 | Hanson et al. | 322/33 |
| 3,663,946 | 5/1972 | Iwaki | 322/23 |
| 3,895,283 | 7/1975 | Peterson | 322/28 X |
| 4,220,908 | 9/1980 | Nicol | 322/28 X |
| 4,435,676 | 3/1984 | Morishita | 322/28 X |
| 4,470,003 | 9/1984 | Mitchell | 322/28 X |
| 4,563,631 | 1/1986 | Mashino et al. | 322/33 |
| 4,594,631 | 6/1986 | Iwaki | 322/33 |
| 4,634,954 | 1/1987 | Kato et al. | 322/29 X |
| 4,727,307 | 2/1988 | Kaneyuki et al. | 322/34 X |

FOREIGN PATENT DOCUMENTS 0047532 11/1984 Japan .
0247800 10/1987 Japan .................................. 322/32

Primary Examiner—Peter S. Wong
Assistant Examiner—Kristine Peckman
Attorney, Agent, or Firm—Sughrue, Mion, Zinn, Macpeak & Seas

[57] ABSTRACT

A control apparatus of an AC generator for use in vehicles is disclosed which includes an AC generator having a field coil, a storage battery to be charged by a rectified output of the AC generator, a voltage regulator for regulating the output voltage of the AC generator and an excessive temperature controller that includes a triangular wave generator, a temperature detection circuit and a comparator. The controller controls the on-time ratio of a power transistor so that the field current flowing through the field coil is changed in accordance with output of the comparator which compares the output level of the temperature detection circuit and the triangular wave output of the triangular wave generator.

5 Claims, 4 Drawing Sheets

AC GENERATOR CONTROL APPARATUS FOR VEHICLES

BACKGROUND OF THE INVENTION

1. Field of the Invention

The present invention relates to an AC generator control apparatus for use in vehicles which serves to suppress any sudden reduction in output of the generator when the overheating safeguard function of the generator control apparatus is actuated.

2. Description of Related Background Art

FIG. 1 is a circuit diagram of a conventional AC generator for use in vehicles. In FIG. 1, an AC generator 1 comprises an armature 101 and a field coil 102. AC voltage generated by the armature 101 is applied to a rectifier 2.

The rectifier 2 comprises a full wave rectifier composed of diodes and has a main output terminal 201, an auxiliary output terminal 202 and a ground terminal 203.

The main output terminal 201 is connected to the positive pole of a storage battery 5, the negative pole thereof being connected to the ground. Electric load 6 of a vehicle is connected in parallel with the battery 5.

The positive pole of the battery 5 is also connected to the auxiliary output terminal 202 of the rectifier 2 through a key switch 7 and an initial exciting resistor 8 and is connected to a collector of a power transistor 305 of a voltage regulator 3 through the field coil 102.

The auxiliary output terminal 202 of the rectifier 2 is connected to the ground through voltage dividing resistors 301 and 302 for purposes of voltage detection. A node between the resistors 301 and 302 is connected to a base of a controlling transistor 304 through a Zener diode 303 and diode 308 in order to prevent reverse currents.

An emitter of the transistor 304 is connected to the ground and a collector thereof is connected to a base of the power transistor 305. An emitter of the power transistor 305 is connected to the ground, the collector thereof being connected to the auxiliary output terminal 202 of the rectifier 2 through a suppression diode 307, and the base thereof being connected to the terminal 202 of the rectifier 2 through a resistor 306.

The voltage regulator 3 is composed of the voltage dividing resistors 301 and 302 for voltage detection, Zener diode 303, controlling transistor 304, power transistor 305, resistor 306, suppression diode 307, and reverse current preventing diode 308.

Reference numeral 4 denotes an excessive temperature controller. A series circuit of a resistor 401 and a Zener diode 402 is connected between the ground and node between the key switch 7 and resistor 8. Point A between the resistor 401 and Zener diode 402 serves as a constant voltage source which supplies voltage to excessive temperature controller 4.

Reference numeral 410 denotes a resistor and 411 is a temperature detecting sensor and these are serially connected between the power source and the ground. The sensor 411 detects the temperature of the AC generator 1.

Point B between the sensor 411 and resistor 410 represents a detection voltage output node of the sensor 411. The detection voltage output node B is connected to a negative input terminal of a comparator 407.

A positive input terminal of the comparator 407 is connected to a node between voltage dividing resistors 408 and 409 for supplying a reference voltage. The resistors 408 and 409 are serially connected between the constant voltage source and the ground.

An output terminal of the comparator 407 is connected to a rectangular pulse oscillator 403 through a diode 404 in order to prevent reverse currents. The output terminal of the comparator 407 is also connected to the constant voltage source through a resistor 406 and connected to the base of the transistor 304 in the voltage regulator 3 through a diode 405 in order to prevent reverse current.

The operation will now be described. First, by turning on the key switch 7, a field current flows from the battery 5 to the field coil 102 of the AC generator 1 through the key switch 7 and initial exciting resistor 8, whereby the AC generator 1 starts the power generating operation.

The AC voltage generated by the AC generator 1 appears in the armature coil 101 and the AC voltage is rectified by the rectifier 2. The rectified voltage appears at the main output terminal 201 and auxiliary output terminal 202.

The rectified voltage at the main output terminal 201 is applied to the storage battery 5 and electric load 6 and the battery 5 starts charging.

The rectified voltage at the auxiliary output terminal 202 or the voltage of the battery 5 is applied to the voltage dividing resistors 301 and 302 of the voltage regulator 3. When the voltage divided by the resistors 301 and 302 rises above a predetermined voltage level, that is, a Zener voltage of the Zener diode 303, the Zener diode 303 is made conductive.

In this way the transistor 304 is turned on and the power transistor 305 is turned off. Thus, the field current of the field coil 102 is shut off and the output voltage of the AC generator 1 may decrease.

When the output voltage of the AC generator 1 or the voltage of the storage battery 5 drops below the predetermined value, the Zener diode 303 is turned off and the controlling transistor 304 is also turned off. The power transistor 305 is then turned on and a field current flows through the field coil 102. Thus the output voltage of the AC generator 1 may increase, whereupon similar operations are repeated in the above manner. The output voltage of the AC generator 1 is controlled by the voltage regulator 3 so that a predetermined constant voltage is held at a substantially consistent level.

The operation of the excessive temperature controller 4 will now be described. FIG. 2 is a characteristic graph showing the relationship between the output of the AC generator 1 and the temperature of the generator 1. When the temperature detecting sensor 411 detects that the temperature of the AC generator 1 exceeds an allowable temperature due to an increase in temperature of the vehicle and reaches an upper limit temperature $T_2$ indicative of the overheated state, the voltage at the detection voltage node B drops below a reference voltage which is determined by the voltage dividing resistors 408 and 409.

The output of the comparator 407 therefore becomes high level. The power transistor 305 of the voltage regulator 3 is intermittently turned on or off in accordance with the oscillating operation of the constant duty ratio oscillator 403. The output voltage of the AC generator 1 is suppressed, thereby inhibiting any rise in temperature of the AC generator 1. In this way the AC generator 1 is protected against damage or breakage due to overheating.

Since control apparatus of conventional AC generators used in vehicles are constructed in the manner mentioned above, when the temperature of the AC generator exceeds the overheating limit temperature $T_2$, the on-time ratio (duty ratio) of the power transistor 305 suddenly decreases to the on-time ratio determined by the rectangular pulse oscillator 403. Therefore, the output voltage of the AC generator 1 also changes suddenly and this leads to a sudden change in the brightness of the head lamps or the like which is discomforting to the driver of the vehicle.

On the other hand, the driving torque of the AC generator 1 also rapidly changes in proportion to the output of the AC generator 1. This leads to the problem that the rotational speed of the engine (not shown) necessary to drive the AC generator 1 changes, and this is also unsettling for the driver.

SUMMARY OF THE INVENTION

The present invention has been achieved with a view to solving these problems and it is an object of the invention to provide an AC generator control apparatus for use in vehicles in which, even during the excessive temperature control operation of the AC generator, any abrupt reduction in the output voltage of the AC generator can be eliminated so as to inhibit any sudden change in brightness of the head lamps or the like, while any change in the rotational speed of the associated engine is also made gentler so that the driver is not made to experience any unsettling feeling.

This object is accomplished by the provision of a control apparatus of an AC generator for vehicles comprising: a voltage regulator for changing the on-time ratio of a power transistor in accordance with the output voltage of the AC generator, thereby regulating the output voltage of the AC generator; a triangular wave generator adapted to generate a triangular voltage; and a comparator for smoothly changing the on-time ratio of the power transistor in accordance with the difference between the triangular voltage and a voltage corresponding to a temperature detected by a temperature detection sensor.

DESCRIPTION OF THE PREFERRED EMBODIMENTS

An embodiment of a control apparatus of an AC generator for vehicles of the present invention will be described hereinbelow with reference to the drawings.

Figure 3:
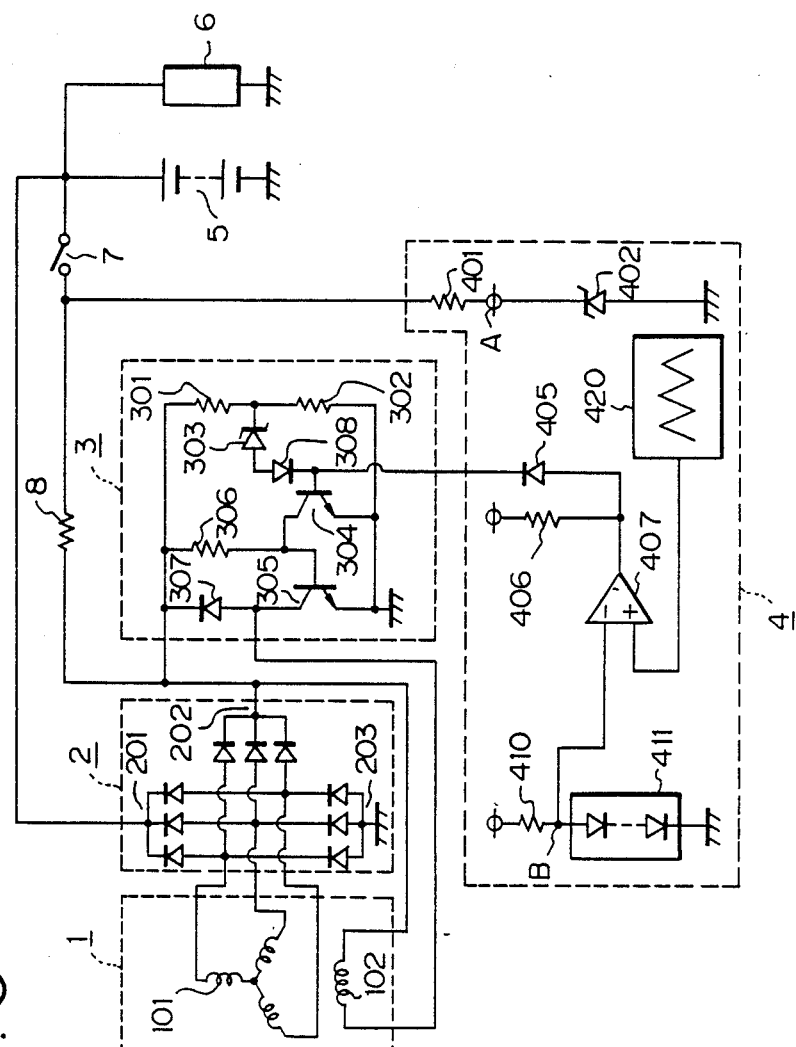
FIG. 3 is a circuit diagram of a control apparatus of an AC generator according to an embodiment of the present invention.

FIG. 3 is a circuit diagram of an embodiment. Since the same parts and components are shown in FIG. 3 as those in FIG. 1 and these are designated by the same reference numerals, a separate description thereof will be omitted. The following explanation will mainly focus on those portions which are different from the arrangement shown in FIG. 1.

Figure 1:
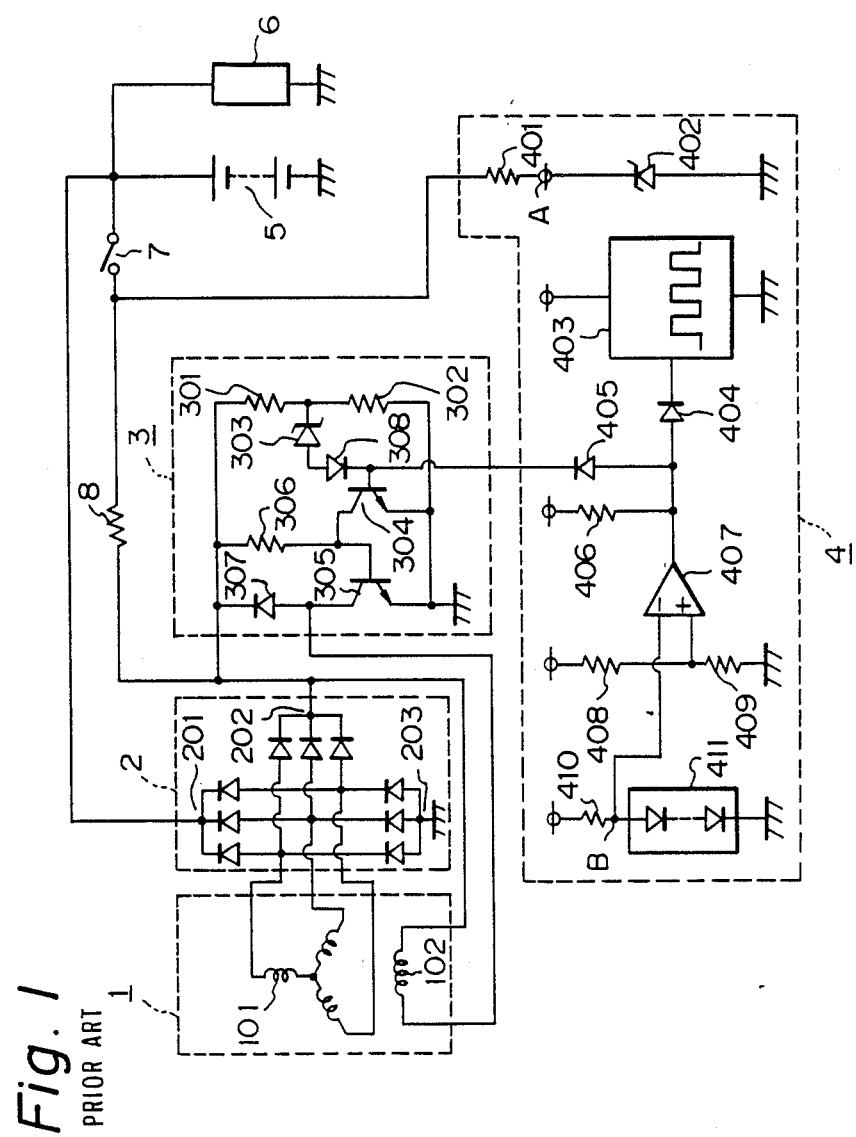
FIG. 1 is a circuit diagram of a control apparatus of a conventional AC generator for use in vehicles.
Figure 2:
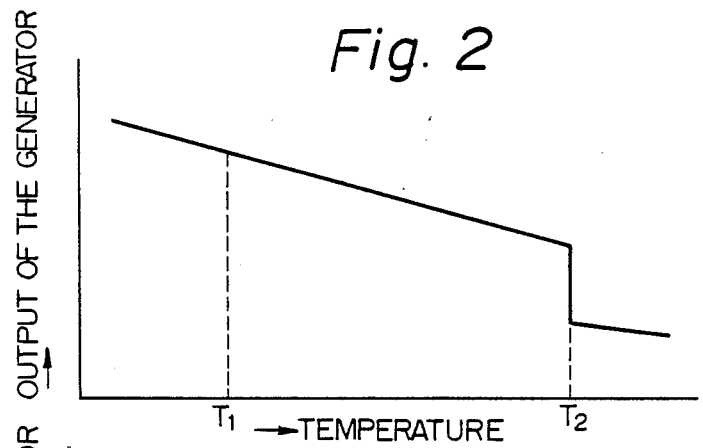
FIG. 2 is a characteristic graph showing the relationship between the output of the AC generator and temperature in the control apparatus of the AC generator shown in FIG. 1.

As will be obvious from a comparison between the circuits indicated in FIGS. 1 and 3, a triangular wave generator 420 is used in the embodiment shown in FIG. 3 in the excessive temperature controller 4 in place of the rectangular pulse oscillator 403.

A triangular voltage generated by the generator 420 is applied to the (+) input terminal of the comparator 407. The detection voltage at the point B of the temperature detecting sensor 411 is applied to the (−) input terminal of the comparator 407. The other parts of the construction are similar to FIG. 1.

Figure 4:
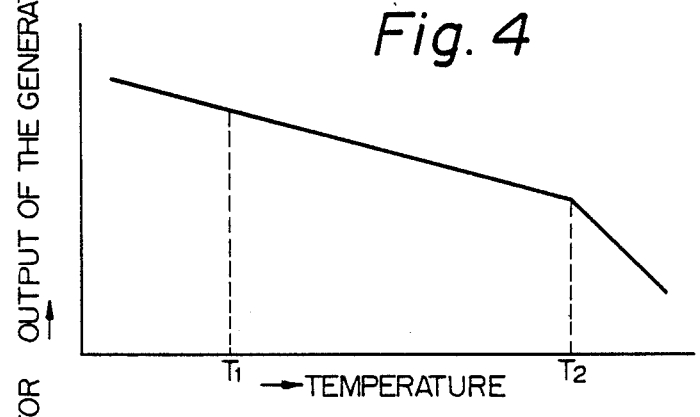
FIG. 4 is a characteristic graph showing the relationship between the output of the AC generator and temperature in the embodiment.

The operation will now be described. FIG. 4 is a characteristic graph showing the relationship between the output of the AC generator 1 and temperature in the embodiment shown in FIG. 3. When the temperature of the AC generator 1 detected by the sensor 411 exceeds the overheating limit temperature $T_2$ shown in FIG. 4, the temperature detection voltage at point B and the triangular voltage generated by the triangular wave generator 420 are compared by the comparator 407.

As a result of the comparison performed by the comparator 407, the power transistor 305 of the voltage regulator 3 is intermittently turned on or off at a on-time ratio that is determined by the output of the comparator 407 in accordance with the difference between the temperature detection voltage and the triangular voltage.

Thus, the output voltage of the AC generator 1 is suppressed, thereby protecting the AC generator 1 from breakage due to overheating. Therefore, when the overheating temperature slightly exceeds the overheating limit temperature $T_2$, the on-time ratio of the power transistor 305 is high and the extent to which the output is suppressed is small.

On the other hand, when the overheating temperature greatly exceeds the temperature $T_2$, the on-time ratio of the power transistor 305 is low and the suppression amount of the output voltage of the AC generator 1 is large. That is, the on-time ratio changes in proportion to the level of the excessive temperature and the extent of suppression of the output of the AC generator 1 changes as shown in FIG. 4.

Figure 5:
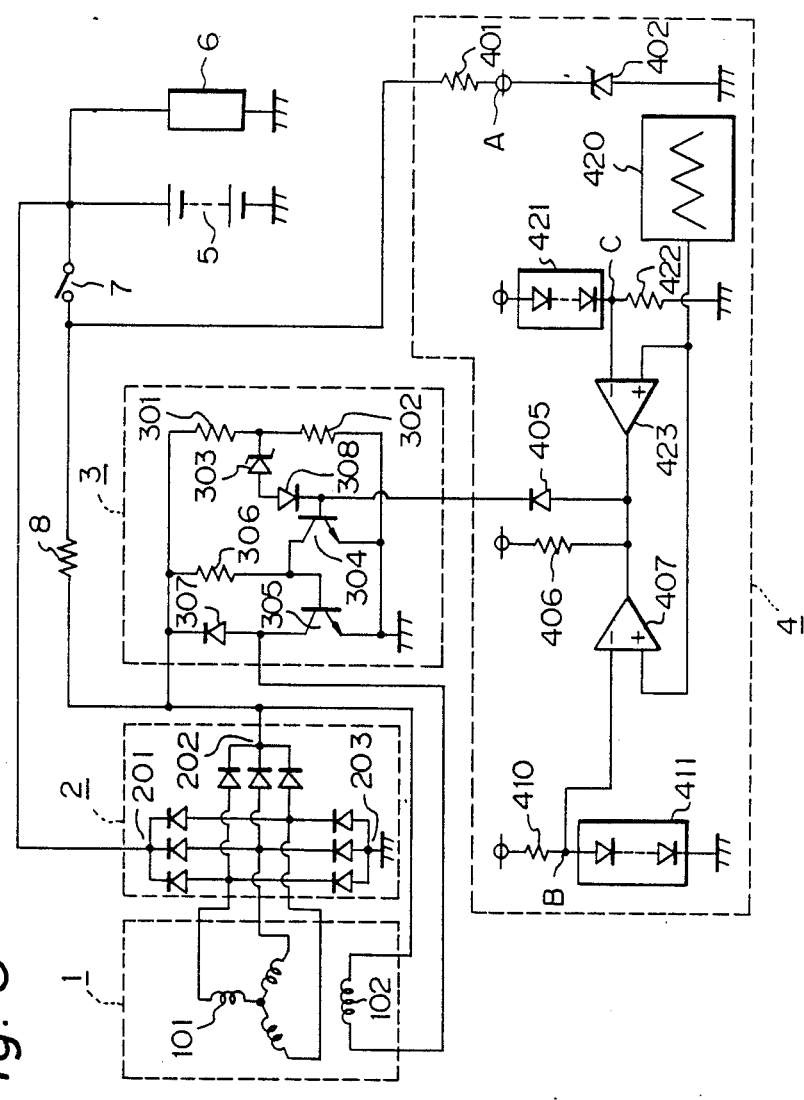
FIG. 5 is a circuit diagram showing a second embodiment of a control apparatus of an AC generator for use in vehicles according to the invention.

FIG. 5 is a circuit diagram showing another embodiment of the invention. In the case of the embodiment shown in FIG. 5, a second temperature detecting sensor 421, a resistor 422, and a comparator 423 are provided in the excessive temperature controller 4 as additional elements of the construction shown in FIG. 3.

That is a series circuit of the second sensor 421 and the resistor 422 is connected between the power source and the ground. A node between the sensor 421 and the resistor 422 is set to a second temperature detection voltage point C. This point C is connected to a (−) input terminal of the comparator 423.

On the other hand, a triangular voltage generated by the triangular wave generator 420 is applied to a (+) input terminal of the comparator 423. The output of the comparators 407 and 423 are connected to the base of the controlling transistor 304 through the reverse current preventing diode 405.

In the embodiment of FIG. 5, an output suppressing circuit on the low temperature side is provided mainly by utilizing the second temperature detecting sensor 421.

Figure 6:
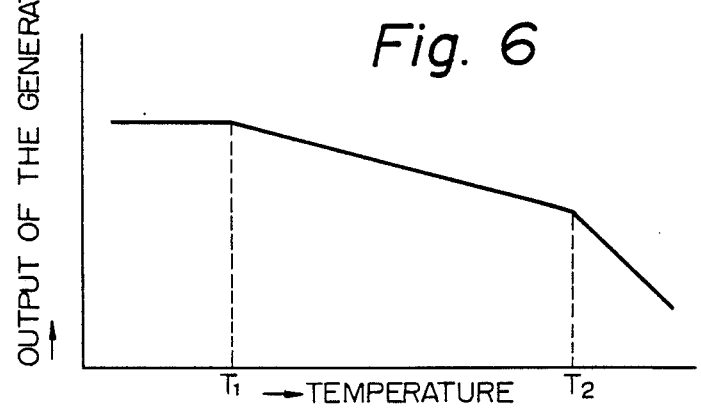
FIG. 6 is a characteristic graph showing the relationship between the output of the AC generator and temperature in the second embodiment.

FIG. 6 is a characteristic graph showing the relationship between the output of the AC generator 1 and temperature based on the embodiment shown in FIG. 5.

In the embodiment shown in FIG. 3, when the resistor of the field coil 102 of the AC generator 1 changes due to a temperature change, the field current changes and, hence the field also varies. Thus, an excessive output higher than the necessary voltage level is generated while the AC generator 1 is at a low temperature.

In the embodiment shown in FIG. 5, when the temperature is below a predetermined lower limit temperature $T_1$ ($T_1 < T_2$) shown in FIG. 6, the second temperature detection voltage at point C and the triangular voltage are compared at the comparator 423, and the power transistor 305 is intermittently turned on or off in accordance with the on-time ratio which is determined by the output of the comparator 423, thereby suppressing the output of the AC generator 1.

In this case, the on-time ratio of the transistor 305 decreases in proportion to the extent to which the temperature is lower than the temperature $T_1$, and the extent to which the output is suppressed accordingly changes. On the other hand the extent to which the output voltage of the AC generator 1 increases due to the change in resistance of the field coil 102 is also synthesized. In this manner, the output can also be set to a constant value as shown in FIG. 6.

As described above, according to the invention, the temperature of the AC generator is detected by the temperature detection sensor and when the temperature detected goes outside the predetermined range, the triangular voltage and detection voltage corresponding to the temperature detected are compared by the comparator. The on-time ratio of the power transistor of the voltage regulator is changed in accordance with the result of this comparison, thereby changing the extent to which the output of the AC generator is supressed. In this way, when the excessive temperature control operation of the AC generator is performed, the output voltage of the AC generator does not suddenly decrease and the driver does not therefore experience any change in the brightness of the head lamps or the like, or any unsettling feeling.

On the other hand, since the extent to which the output of the AC generator is suppressed changes smoothly, the driving torque of the AC generator also changes slowly. Any change in the rotational speed of the engine necessary to drive the AC generator also becomes gentle so the driver does not experience anything unsettling when driving the vehicle.

Although the invention has been described in its preferred form with a certain degree of particularity, it is understood that the present disclosure of the preferred form has been changed in the details of construction and the combination and arrangements of parts may be resorted to without departing from the spirit and the scope of the invention as hereinafter claimed.

What is claimed is:

1. A control apparatus of an AC generator for use in a vehicle, comprising:
    an AC generator having a field coil and operative to produce an output voltage;
    a storage battery which is charged by a rectified output of the AC generator;
    a voltage regulator for regulating the output voltage of the AC generator comprising a power transistor and a means of detecting the value of one of a voltage of said battery and an output voltage of the AC generator, said regulator being operative for intermittently turning on or off said power transistor in accordance with said detected value, and intermittently shutting on or off a field current which is supplied to said field coil; and
    an excessive temperature controller comprising a triangular wave generator, a temperature detection circuit for generating an output voltage corresponding to a detected temperature and a comparator for comparing said output voltage corresponding to a temperature of the AC generator detected by said temperature detection circuit and a triangular wave voltage generated by said triangular wave generator and producing a comparison output; said controller thereby controlling the on-time ratio of said power transistor so that it is changed in accordance with said comparison output, thereby causing the field current to flow intermittently.

2. An apparatus according to claim 1, wherein said temperature detection circuit and said comparator are constructed in such a manner that when the temperature of the AC generator is lower than a predetermined upper limit temperature, said triangular voltage generated by said triangular wave generator does not influence said power transistor, and when said temperature of the AC generator exceeds said upper limit temperature, a signal to turn off said power transistor is generated during the period in which the triangular voltage is higher than said output voltage of the temperature detection circuit.

3. An apparatus according to claim 2, wherein said temperature detection circuit comprises a resistor and a plurality of serially connected diodes, each of said diodes having an anode and a cathode, wherein the anode of one of said diodes is coupled to the resistor and also is connected to an inverting input terminal of said comparator.

4. An apparatus according to claim 2, further comprising a second temperature detection circuit for generating an output voltage corresponding to a detected temperature and a second comparator, and wherein when the temperature of said AC generator is higher than a predetermined lower limit temperature, the triangular voltage from the triangular wave generator does not influence the power transistor, and when said temperature is lower than the lower limit temperature, a signal to turn off the power transistor is generated during the period when said triangular voltage is higher than said output voltage of said second temperature detection circuit.

5. An apparatus according to claim 4, wherein said comparator has an inverting input terminal and said second temperature detection circuit comprises a plurality of serially connected diodes, each having an anode and a cathode, and a resistor in series, wherein the cathode of one of said diodes is coupled to said resistor and also is connected to an inverting input terminal of said second comparator.

* * * * *